United States Patent
Warren et al.

[11] Patent Number: 5,516,239
[45] Date of Patent: May 14, 1996

[54] BOTTLE CONVEYOR

[75] Inventors: Jack D. Warren, Oshkosh; Randolph A. McCarry, Neenah, both of Wis.

[73] Assignee: Pak Air, Inc., Neenah, Wis.

[21] Appl. No.: 199,108

[22] Filed: Feb. 22, 1994

[51] Int. Cl.$^6$ .................................................. B65G 51/02
[52] U.S. Cl. ........................................................ 406/88
[58] Field of Search ................................. 406/86, 88

[56] References Cited

U.S. PATENT DOCUMENTS

| | | | |
|---|---|---|---|
| 3,734,567 | 5/1973 | Fong | 406/86 |
| 3,953,076 | 4/1976 | Hurd | 406/88 |
| 4,284,370 | 8/1981 | Danler et al. | 406/86 |
| 5,028,174 | 7/1991 | Karass | 406/88 |
| 5,100,265 | 3/1992 | Mirkin | 406/86 |
| 5,147,153 | 9/1992 | Aidlin et al. | 406/86 |
| 5,161,919 | 11/1992 | Smith et al. | 406/86 |
| 5,246,314 | 9/1993 | Smith et al. | 406/86 |
| 5,299,889 | 4/1994 | Langenbeck | 406/88 |

*Primary Examiner*—Andrew C. Pike
*Attorney, Agent, or Firm*—Nilles & Nilles

[57] ABSTRACT

A bottle conveyor has a neck guide formed from opposed lips which are sufficiently thin to be used with bottles having extremely small neck rings and/or extremely short necks and which permit air to be directed onto the bottles from plenum slots positioned directly beneath the neck ring. The lips of the neck guide are preferably formed from a relatively hard, strong, low friction resinous plastic rather than conventional UHMW plastic or metallic lips. The high plenum slots and low friction lip material combine in operation to eliminate the need for a second plenum and thus substantially reduce floor space required by the conveyor as well as the amount of air required for conveyance. The air flowing against the necks of the bottles also provides substantial lift onto the bottles, thus reducing drag and thereby reducing further the amount of air required for conveyance.

15 Claims, 4 Drawing Sheets

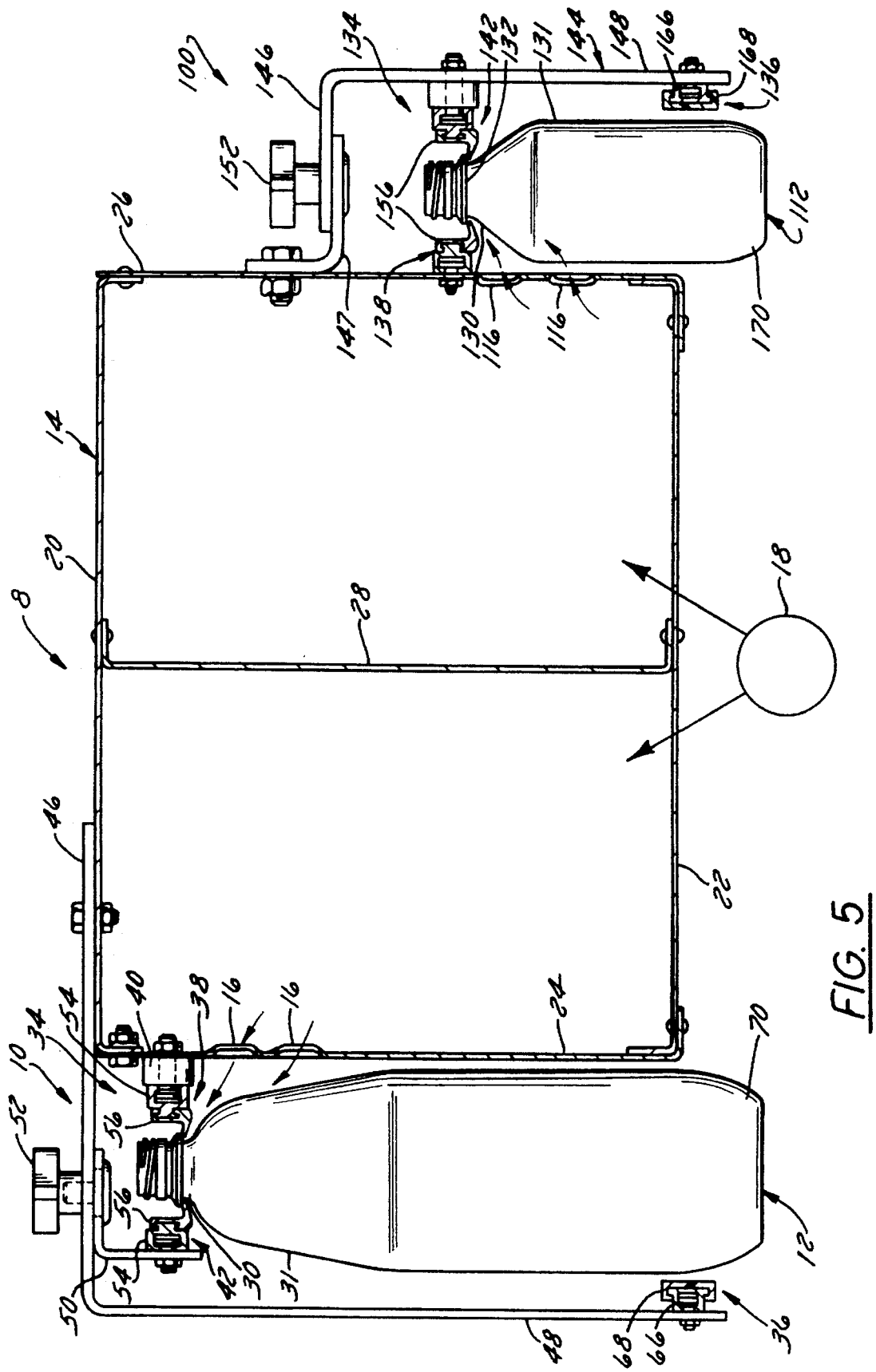

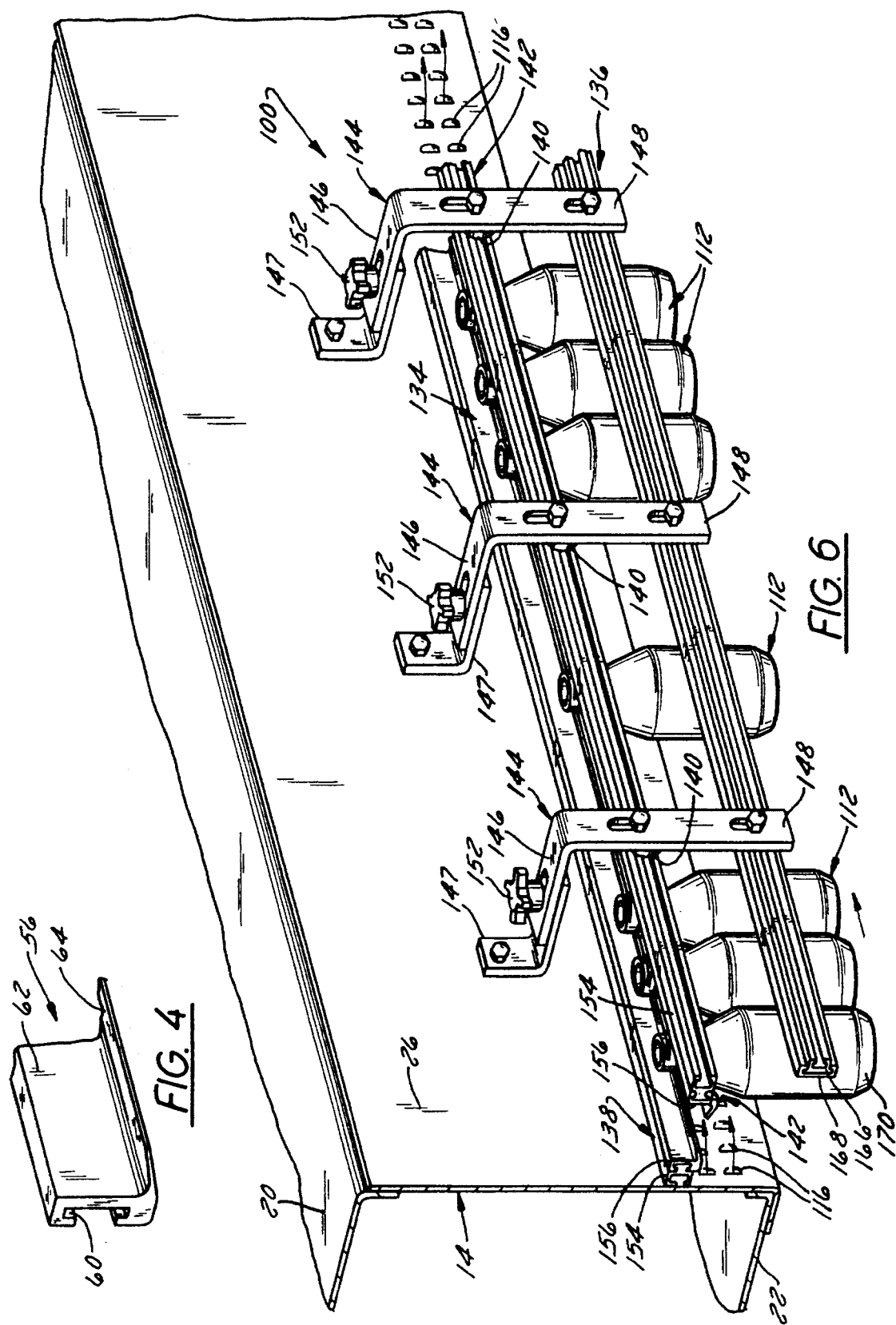

BOTTLE CONVEYOR

BACKGROUND OF THE INVENTION

1. Field of the Invention

The invention relates to P.E.T. bottle conveyors and more particularly relates to a bottle conveyor which propels bottles by forcing air onto bottles beneath their neck rings, and to an extremely thin guide which may be used in such a bottle conveyor.

2. Discussion of Related Art

Conveyors are well known for transporting plastic bottles or the like from one location to another, e.g., in a bottling plant. The bottles typically include an enlarged body, an annular neck ring, and a neck extending from the neck ring to the body. The typical conveyor includes a neck guide which supports the neck rings of the bottles as air is forced onto the bottles from directional slots formed in plenums located on opposite sides of the bottles, thereby propelling bottles along the neck guide. Such neck guides typically include lips formed from a UHMW (Ultra High Molecular Weight) plastic, polished stainless steel, or coated stainless steel. These conventional lips exhibit significant strength and/or shape limitations and thus must engage a relatively large area of the neck ring and/or must be relatively thick and extend a substantial distance beneath the neck ring. Since shipping and aesthetic considerations have led bottlers and the like to employ bottles with small neck rings and with very short necks, traditional thick neck guides are proving unacceptable for the conveyance of some bottles.

The traditional relatively thick neck guide also imposes limitations on plenum slot placement. That is, the traditional guide takes up substantial space near the top of the bottle such that the plenum slots must be located beneath the neck. Such slots are thus incapable of directing conveying air directly onto the transition area between the neck ring and neck of the bottle, and in fact often direct air onto the lower portion of the body of the bottle. Air as thus applied imposes little or no lift on the bottle and thus does not reduce the friction between the neck guide and the neck ring. This necessarily increases the volume of air required for conveyance. Moreover, directing air onto the lower rather than the upper portion of the bottle tends to impose substantial pivoting or rocking forces at the interface between the neck ring and the neck guide which at best increase drag and which may render conveyance impossible. Such rocking forces are offset in the typical prior art conveyor by employing a dual plenum configuration in which air is imposed on both sides of the bottle by opposed plenums. The lateral forces imposed by these dual airstreams tend to offset one another so that rocking forces are reduced. Such a dual plenum configuration, however, requires additional equipment and floor space and also requires more air than would otherwise be required for conveyance.

OBJECTS AND SUMMARY OF THE INVENTION

It is therefore an object of the invention to provide a bottle conveyor the neck guide of which can accommodate bottles having extremely small neck rings and/or extremely short necks.

Another object of the invention is to provide the neck guide of the bottle conveyor with opposed thin lips which are constructed from a hard, strong, low friction material.

In accordance with a first aspect of the invention, a bottle conveyor is provided which includes a plenum including a side wall having a plurality of slots formed therethrough for the passage of air, and a bottle support and guide structure positioned beside the side wall of the plenum. The bottle support and guide structure preferably includes a support bracket which is suspended from the plenum, a neck guide supported on the bracket, and a guide rail. The bracket is preferably generally L-shaped and has a first leg extending generally horizontally away from the side wall of the plenum, the length of the first leg being adjustable, and a second leg extending downwardly from the first leg. The neck guide preferably includes a first support rail connected to the side wall of the plenum, a second support rail connected to the second leg of the bracket, and first and second opposed thin lips mounted on the first and second support rails, respectively, and spaced so as to support a neck ring of the bottle. The lips are formed from an extremely thin plastic material having a thickness of no more than 0.1" and preferably less than 0.04". A particularly preferred material is a resin having a relatively high strength and a dynamic coefficient of friction of less than 0.07. The lips may be angled upwardly to present a generally linear contact surface for engagement with bottle neck rings.

The conveyor may be part of a dual conveyor system, in which case the plenum includes a second side wall having a plurality of slots formed therethrough for the passage of air, and further comprising a second bottle support and guide structure positioned beside the second side wall of the plenum.

In order to facilitate assembly, the plenum is preferably formed from a plurality of plenum sections joined at seams, and the support rails are formed from a plurality of rail sections joined at seams which are staggered with respect to the seams of the plenum.

Still another object of the invention is to provide a bottle conveyor having an air plenum on only one side of the conveyor.

Yet another object of the invention is to provide a method of conveying one or more lines of bottles using a single plenum.

In accordance with another aspect of the invention, these objects are achieved by providing a bottle conveyor comprising 1) a single plenum having an outer side wall which has a plurality of slots formed therethrough for the passage of a conveying fluid outwardly from the plenum, and 2) a neck guide located beside the plenum and formed from opposed lips positioned above the slots and spaced so as to support a neck ring of a bottle as the bottle is conveyed by air flowing out of the slots. The method is carried out using this conveyor.

Still another object of the invention is to provide a method of conveying bottles without interference from the neck rings of the bottles.

In accordance with another aspect of the invention, this object is achieved by providing a process comprising supporting a neck ring of a bottle on opposed lips of a bottle neck guide, the opposed lips being 1) sufficiently thin to provide clearance between the lips and a neck of the bottle, and 2) formed from a plastic material having a thickness of less than 0.1" and preferably less than 0.04".

Preferably, the propelling step comprises directing air onto a single side of the bottle only.

Yet another object of the invention is to provide a method of assembling a bottle conveyor and of readying the conveyor for use.

In accordance with yet another aspect of the invention, this object is achieved by joining plenum sections at seams, each of the plenum sections having a plurality of slots formed in a side wall thereof, and attaching a bottle support and guide structure to the plenum. The bottle support and guide structure includes a support bracket which is suspended from the plenum, a neck guide, and a guide rail. The bracket is generally L-shaped and has (1) a first leg extending generally horizontally away from the side wall of the plenum, the length of the first leg being adjustable, and (2) a second leg extending downwardly from the first leg. The neck guide includes a first support rail connected to the side wall of the plenum, and a second support rail connected to the second leg of the bracket, each of the first and the support rails including a plurality of rail sections joined at seams which are staggered with respect to those of the plenum sections. The neck guide also includes first and second opposed thin lips mounted on the first and second support rails, respectively, and spaced so as to support a neck ring of the bottle, the lips being formed from a plastic having a thickness of less than 0.1" and preferably less than 0.04". The assembling step preferably is followed by a conveying step including supporting a neck ring of a bottle on the opposed lips of a bottle neck guide, and propelling the bottle by directing a conveying fluid out of the slots in the plenum and onto the neck of the bottle at a location beneath the neck.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which:

FIG. 4 is a perspective view of a portion of a lip of the neck guide of the first conveyor of FIGS. 1–3;

FIG. 5 is a sectional end elevation view of the dual conveyor system of FIGS. 1 and 2; and FIG. 6 is a partially cut away perspective view of the second bottle conveyor of the system of FIGS. 1, 2, and 5.

DETAILED DESCRIPTION OF THE PREFERRED EMBODIMENTS

1. Résumé

Figure 1:
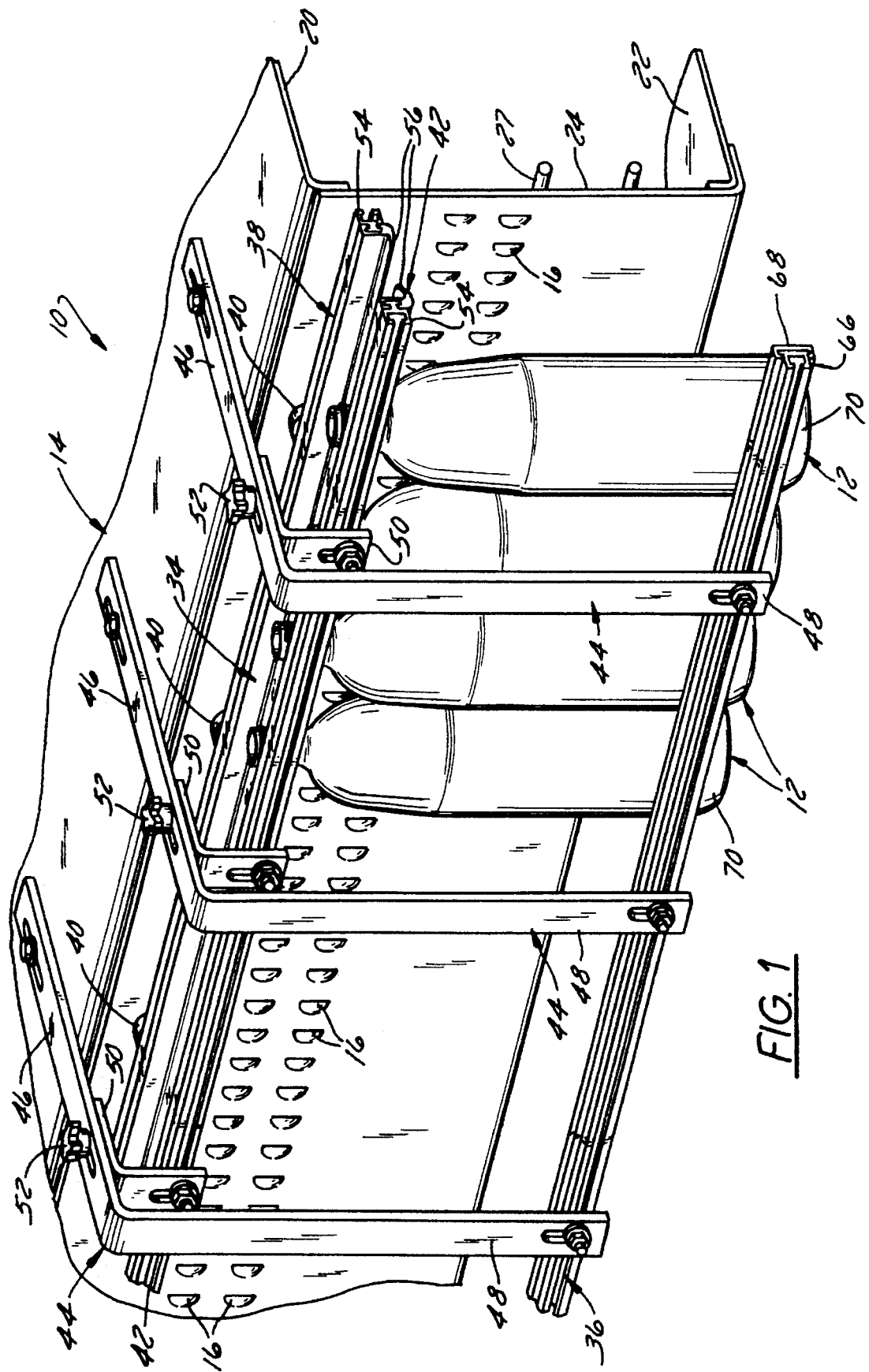
FIG. 1 is a perspective view of a first conveyor of a dual bottle conveyor system constructed in accordance with a preferred embodiment of the invention.

Pursuant to the invention, a bottle conveyor is provided having a neck guide formed from opposed lips which are sufficiently thin to be used with bottles having extremely small neck rings and/or extremely short necks and which permit air to be directed onto the bottles from plenum slots positioned directly beneath the neck ring. The lips of the neck guide are extremely thin and are preferably formed from a relatively hard, strong, low friction plastic rather than from conventional UHMW plastic or metallic lips. The lips are also preferably inclined so as to present a generally linear contact surface for engagement with the bottle neck rings. The high plenum slots and low friction lip material combine in operation to eliminate the need for a second plenum and thus substantially reduce floor space required by the conveyor as well as the amount of air required for conveyance. The air flowing against the necks of the bottles also provides substantial lift onto the bottles, thus reducing drag and thereby reducing further the amount of air required for conveyance.

2. System Overview

Referring now to the drawings and to FIGS. 1–4 in particular, a dual conveyor system 8 is provided including first and second conveyors 10 and 100 supplied with conveying fluid from respective sidewalls of a common plenum 14 as detailed below in the discussions of the respective conveyors 10 and 100. Most prior art conveyors require two plenums for each conveying line and thus cannot supply air to two conveyors from a single plenum. The only known prior art systems which can supply air to two conveyors from a single plenum blow air from a bottom surface of the plenum into and around both sides of the lip of the bottles on each of the conveyor. This prior art structure is not only relatively complex, but also necessarily blows air or other conveying fluid into the interior of the bottle. This latter prior art process thus may not be acceptable in some applications such as pharmaceuticals in which contamination of the interior of the bottle with conveying air must be avoided.

Each conveyor 10, 100 could be used to transport virtually any plastic or other lightweight bottle using a conveying fluid suitable for a particular application. The illustrated conveyors 10, 100 are designed for use in the soft drink industry and conveys bottles 12, 112, blow molded from a lightweight plastic such as polyethylene terephthalate (PET), using room air as a conveying fluid. Air is supplied to the conveyors 10 and 100 through directional slots 16, 116 formed in the plenum 14, which air is supplied to the plenum 14 by a suitable blower or fan 18 which is, per se, well known and which is thus only schematically illustrated in FIGS. 2 and 5. It should be noted that the conveying fluid could vary from application to application. For instance, inert or sterile fluids could be used in the food, pharmaceutical, or other industries in which room air could contaminate the bottles. However, room air is used most often, and will henceforth be referenced as the conveying fluid for the sake of conciseness.

The plenum 14 is formed from a sheet metal framework forming a top wall 20, a bottom wall 22, and side walls 24, 26. The plenum 14 is formed from a plurality of sections connected to one another by connectors 27 or the like.

A longitudinal partition 28 may be provided to separate the airstreams fed to the two conveyors 10 and 100. Such a partition is, however, not necessary to the operation of such a dual conveyor system and could be eliminated. Of course, one of the conveyors 10 or 100 could also be eliminated if not required in a particular application.

The slots 16, 116 are formed in the opposed side walls 24, 26 of the plenum 14, e.g., by punching, so as to direct air out of the plenum 14 and into contact with the bottles 12 and 112 as illustrated by the arrows in the drawings. The position of the slots 16 and 116 in the side walls 24, 26 will vary depending upon the type of bottle being conveyed.

Each of the conveyors 10, 100 will now be described in turn.

3. Construction and Operation of First Conveyor

Referring again to FIGS. 1-4, the first conveyor 10 is designed to convey relatively large bottles, such as two liter soft drink bottles 12, which have very short necks 30 and which also have relatively small neck rings 32. The conveyor 10 includes the plenum 14 and a bottle support and guide structure including an upper neck guide 34 and a lower guide rail 36, both of which are mounted on the plenum 14. Specifically, an inner portion 38 of the neck guide 34 is bolted or otherwise affixed to the first side wall 24 of the plenum 14 with an elastomeric spacer 40 therebetween, and the guide rail 36 and an outer portion 42 of the neck guide 34 are mounted on the plenum 14 by a plurality of L-shaped brackets 44. Each bracket 44 has a horizontal leg 46 connected to the top wall 20 of the plenum 14 and a vertical leg 48 extending generally parallel to the plenum side wall 24. The guide rail 36 is bolted to the vertical legs 48 of the brackets 44, and the outer portion 42 of the neck guide 34 is bolted to sub-brackets 50 which are in turn bolted to the horizontal legs 46 of the brackets 44. The brackets 44 and 50, outer neck guide portion 42, and guide rail 36 are preferably bolted to one another through slots permitting vertical and/or horizontal adjustment of the conveyor components. Horizontal adjustment of the sub-brackets 50 and of the accompanying neck guide portion 42 is typically required relatively frequently to accommodate relatively small variations in bottle neck ring configuration. A hand screw 52 is preferably provided on each bracket 44 to facilitate such relatively frequent adjustment.

Each of the inner and outer neck guide portions 38 and 42 is of identical construction and includes a support rail 54 and a lip 56. Each support rail 54 may comprise any structure capable of supporting the associated lip 56 but preferably is formed from lightweight aluminum or the like and presents a lug 58 which slidably engages a corresponding notch 60 in the mating lip 56. As illustrated in FIG. 1, the guide rail sections and plenum sections are of different lengths so that the seams in the rail 54 are staggered with respect to corresponding seams in the plenum 14, thereby minimizing the effects of such seams on guide placement.

Figure 3:
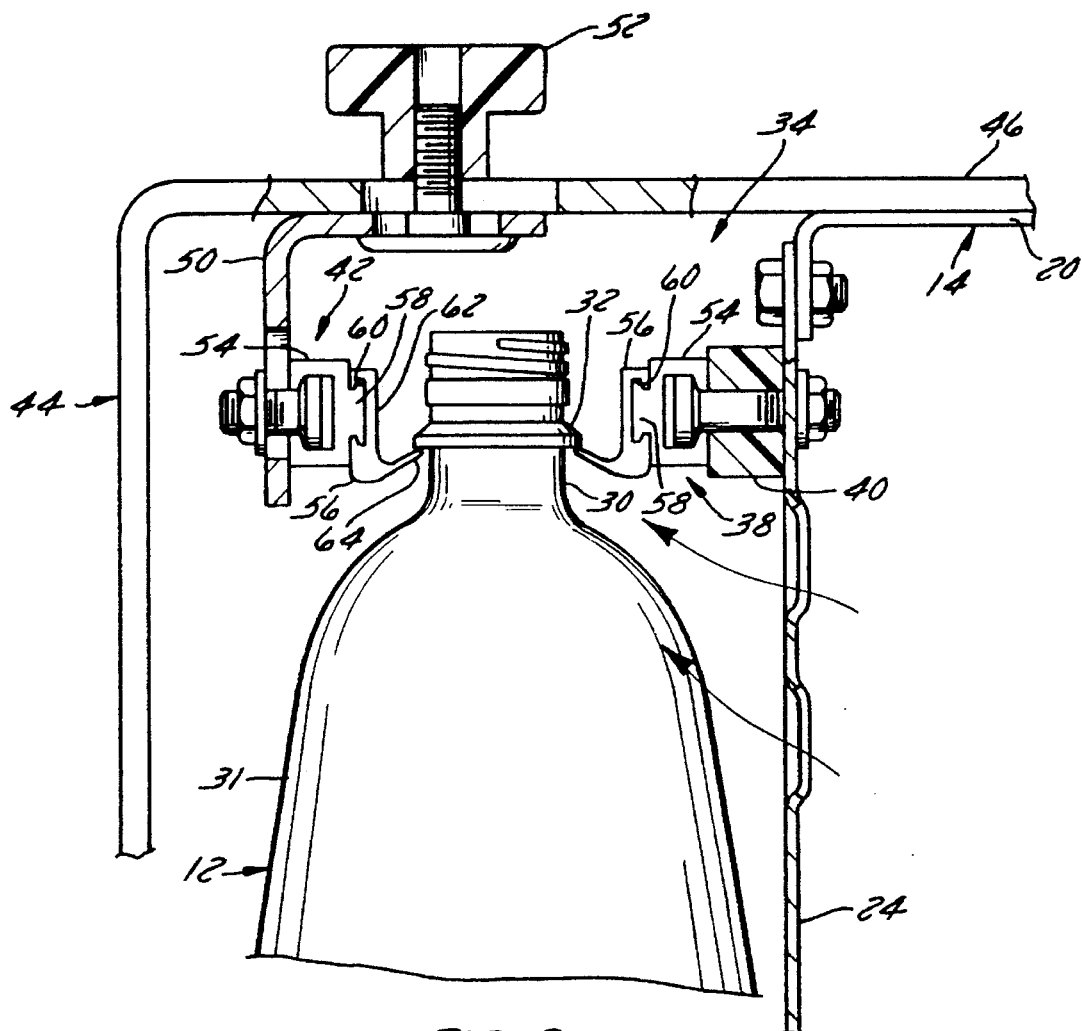
FIG. 3 is a sectional end elevation view of the upper portion of the first conveyor of FIGS. 1 and 2.
Figure 2:
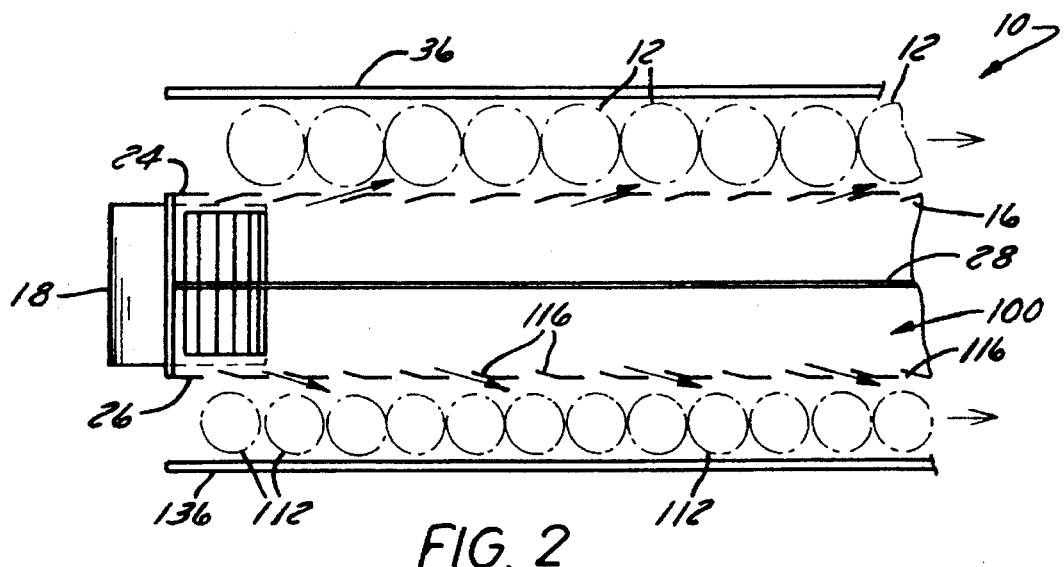
FIG. 2 is a schematic top plan view of the dual conveyor system of FIG. 1.

Referring now to FIGS. 3 and 4, each lip 56 is generally L-shaped and includes a vertical rail engagement leg 62 presenting the notch 60 for receiving the lug 58 of the support rail 54, and a neck ring support leg 64. The support leg 64 tapers towards its free end and is very narrow—on the order of less than 0.04 inches on average—so as to provide a clearance between the bottom of the leg 64 and the body 31 of the bottle 12 which is wide enough to permit the conveyance of bottles having virtually no neck. The extremely thin lip 56 also permits the uppermost directing slots 16 of plenum 14 to be positioned just beneath the neck ring 32 of the bottle 12, thereby providing benefits detailed below.

Support leg 64 is also upwardly inclined so to present a generally linear contact surface for engagement with the bottle neck rings, thereby reducing friction through reduction of contact area. The inclined leg 64 also serves to direct air into the interface between the leg 64 and the bottle neck rings, thereby increasing lift on the bottles and further reducing friction. While the angle of inclination may vary, experiments have shown that a leg which is inclined about 20° with respect to the horizontal produces optimal results.

Conventional lips constructed of UHMW plastic, aluminum, or the like cannot be formed as thin as the leg 64 of lip 56 while still (1) presenting adequate strength to support the bottle, and (2) holding the tolerances required to assure adequate lip spacing. The lip 56 should accordingly be formed from a plastic material which is relatively strong, has a low coefficient of friction, and yet can be formed in shapes and with a degree of strength and dimensional stability not possible with UHMW plastics and the like. Materials having dynamic coefficients of friction of less than 0.1 and presenting the remaining properties discussed above are preferred. A particularly preferred material is a plastic resin material manufactured by General Electric and having a dynamic coefficient of friction of less than 0.07. UHMW plastic, on the other hand, has a dynamic coefficient of friction of about 0.10–0.22.

The lower guide rail 36 could be any device which in operation prevents excessive outward swinging of the bottles 12. The illustrated guide rail 36 includes a support rail 66 of identical construction to the support rails 54 for the neck guide 34 and an overlying guide sleeve 68 formed from UHMW plastic or some other material with a relatively low coefficient of friction which also does not scuff or dirty the bottles 12 upon contact.

The conveyor 10 is assembled by attaching the plenum sections to one another using the connectors 27. The neck guide 34 and guide rail 36 are then formed by sliding the lips 56 onto the support rails 54, by sliding the sleeve 68 onto the support rail 66, by attaching the inner neck guide portion 38 to the plenum 14, and by attaching the outer neck guide portion 42 and guide rail 36 to the brackets 44 and by attaching the brackets 44 to the plenum 14. The conveyor 10 is then readied for operation by horizontally and/or vertically adjusting the position of the outer portion 42 of the neck guide 34 as required.

In operation, the bottles 12 to be transported are supplied from a storage area to the neck guide 34 and are supported by their neck rings 32 on the neck guide so that their bases 70 are positioned beside and slightly below the plenum 14 as illustrated in FIG. 5. Air is then supplied to the plenum 14 by blower 18 at a rate of, e.g., 2–3 thousand cubic feet per minute, and emerges from the directional slots 16 formed in the side wall 24 of plenum 14. As illustrated in detail in FIG. 3, a substantial portion of this air impinges the bottles 12 in the transition area between the neck ring 32 and the neck 30, thus providing at least two benefits. First, air in this area provides a lifting effect on the neck ring 32 which reduces drag as the bottles 12 move along the neck guide 34 and which thus permits faster conveyance using a given volume of air. This effect can if desired be enhanced by forming the horizontal leg 64 of each of the lip members 56 with a curved surface analogous to an airfoil providing increased lift in the vicinity of the neck ring 32. Second, the lateral forces imposed on the bottles 12 by the air flowing out of slots 16 are imposed at a location relatively close to the neck ring 32 and thus impose at most only very slight rocking forces on the bottles 12 which are much smaller than those imposed by air emerging from conventional slots located closer to the base of the bottle. It is therefore unnecessary to apply air forces to the opposite side of the bottle 12 to counteract those imposed by the conveying air. This in turn permits the conveyance of a bottle 12 by supplying air to only a single side thereof using only a single plenum 14, thereby significantly reducing the size and complexity of the conveyor 10 as well as reducing the volume of air required for conveyance.

4. Construction and Operation of Second Conveyor

Referring now to FIGS. 5 and 6, conveyor 100 is essentially identical to the first conveyor 10 and could be adapted to convey bottles identical to the bottles 12. However, the conveyor 100 of the illustrated embodiment is adapted to convey relatively small bottles such as 16 oz. soft drink bottles 112 as opposed to the relatively large bottles 12 handled by the first conveyor 10. The conveyor 100 is therefore designed to conform to the size and shape of these smaller bottles. Thus, relatively small brackets 144 are used to support the neck guide 134 and guide rail 136 and are attached to the outer wall 26 of the plenum 14 relatively near the bottom wall 22 thereof so as to position the bases of the bottles 112 beneath the plenum 14 in order to permit the conveyor 100 to deposit the bottles onto downstream devices without interference from the plenum 14. The sub-brackets 50 of the first conveyor 10 are each replaced by a horizontal leg of bracket 144 formed from two pieces 146, 147 connected by a hand screw 152 permitting horizontal adjustment of the leg. The directional slots 116 in the plenum side wall 26 are also moved downwardly with respect to the corresponding slots 16 of the first conveyor 10 so as to assure the supply of air to the transition area between the neck 130 and the neck ring 132 of the bottle 112, just as the slots 16 of the first conveyor 10 are positioned so as to supply air to the transition area of the larger bottle 12. The construction and operation of the conveyor 100 is otherwise identical to that of the first conveyor 10 and accordingly will not be described in detail. Suffice it to say that elements of conveyor 100 corresponding to elements of the conveyor 10 are denoted by the same reference numerals, incremented by 100. Thus, 131 denotes the body of bottle 112, 138 denotes the inner neck guide portion, 140 denotes a spacer, 142 denotes an outer neck guide portion, 148 denotes a vertical leg of bracket 146, 154 denotes a support rail, 156 denotes a lip, 166 denotes another support rail, 168 denotes a guide sleeve overlying support rail 166, and 170 denotes the base of the bottle 112.

Many changes and modifications could be made to the invention without departing from the spirit thereof. The scope of such changes and modifications can be understood from the appended claims.

What is claimed is:

1. A bottle conveyor comprising:
   (A) a plenum including a side wall having a plurality of slots formed therethrough for passage of air; and
   (B) a bottle support and guide structure positioned beside said side wall of said plenum and including
      (1) a support bracket which is suspended from said plenum, said bracket being generally L-shaped and having
         (a) a first leg extending generally horizontally away from said side wall of said plenum, a length of said first leg being adjustable, and
         (b) a second leg extending downwardly from said first leg,
      (2) a neck guide including
         (a) a first support rail connected to said side wall of said plenum,
         (b) a second support rail connected to said second leg of said bracket, and
         (c) first and second opposed thin lips mounted on said first and second support rails, respectively, and spaced so as to support a neck ring of a bottle, and
      (3) a guide rail mounted on said support bracket beneath said second lip.

2. A bottle conveyor as defined in claim 1, wherein said plenum includes a second side wall having a plurality of slots formed therethrough for passage of the air, and said bottle conveyor further comprising a second bottle support and guide structure positioned beside said second side wall of said plenum.

3. A bottle conveyor comprising:
   (A) a single plenum having an outer side wall which has a plurality of slots formed therethrough for passage of a conveying fluid outwardly from said plenum; and
   (B) a neck guide located beside said plenum and formed from opposed lips positioned above said slots and spaced so as to support a neck ring of a bottle as said bottle is conveyed by flow of the conveying fluid out of said slots.

4. A process comprising:
   (A) supporting a neck ring of a bottle on opposed lips of a bottle neck guide, said bottle having a neck located beneath said neck ring, said opposed lips presenting a contact surface; and
   (B) propelling said bottle by directing a conveying fluid onto said bottle at a location beneath said neck ring, wherein said propelling step comprises directing said conveying fluid onto a single side of said bottle only.

5. A process according to claim 4, wherein said propelling step comprises directing said conveying fluid out of slots formed in a side wall of a plenum.

6. A process as defined in claim 4, wherein said propelling step comprises imposing lifting forces, created by fluid flow over said lips, onto said neck ring so as to reduce drag as said bottle slides along said neck guide.

7. A process as defined in claim 4, further comprising guiding a lower side portion of said bottle via a guide rail extending in parallel with said bottle neck guide.

8. A process as defined in claim 4, further comprising adjusting a position of one of said lips prior to said supporting step.

9. A process comprising:
   (A) supporting a neck ring of a bottle on opposed lips of a bottle neck guide, said bottle having first and second opposed sides; and
   (B) propelling said bottle by directing a conveying fluid out of slots formed in a side wall of a plenum onto said first side of said bottle, said second side of said bottle being exposed to ambient conditions only.

10. A process comprising:
    (A) assembling an air conveyor, said assembling step including:
       (1) providing a plenum having a plurality of slots formed in a side wall thereof,
       (2) attaching a bottle support and guide structure to said plenum, said bottle support and guide structure including
          (a) a support bracket which is suspended from said plenum, said bracket being generally L-shaped and having
             (i) a first leg extending generally horizontally away from said side wall of said plenum, a length of said first leg being adjustable, and
             (ii) a second leg extending downwardly from said first leg,
          (b) a neck guide including
             (i) a first support rail connected to said side wall of said plenum,
             (ii) a second support rail connected to said second leg of said bracket, and
             (iii) first and second opposed thin lips mounted on said first and second support rails, respectively, and spaced so as to support a neck ring of a bottle, and (c) a guide rail mounted on said support bracket beneath said second lip;

(B) supporting said neck ring of said bottle on said opposed lips of said neck guide; and (C) propelling said bottle by directing a conveying fluid out of said slots in said side wall of said plenum and onto a neck of said bottle at a location beneath said neck guide.

11. A bottle conveyor comprising:

(A) a single plenum including an outer side wall having a plurality of slots formed therethrough for passage of a conveying fluid outwardly from said plenum; and (B) a neck guide located beside said plenum and formed from opposed thin lips positioned above said slots and spaced so as to support a neck ring of a bottle, each of said lips including a support leg having an inclined support surface extending upwardly and inwardly towards another of said lips in order to present a generally linear contact surface for said neck ring, wherein said lips are spaced so as to support the neck ring of the bottle as the bottle is conveyed by flow of the conveying fluid out of said slots.

12. A conveyor as defined by claim 11, wherein said support surface of said support leg of each of said lips is inclined at an angle of about 20° with respect to a horizontal plane.

13. A conveyor as defined in claim 12, wherein each of said lips is generally L-shaped and further includes a generally vertical leg, and wherein each of said support legs extends upwardly and inwardly from a lower end of a respective one of said vertical legs.

14. A bottle conveyor comprising:

(A) a single plenum including an outer side wall having a plurality of slots formed therethrough for passage of a conveying fluid outwardly from said plenum; and (B) a neck guide located beside said plenum and formed from opposed thin lips positioned above said slots and spaced so as to support a neck ring of a bottle, each of said lips including a vertical leg and a support leg, each of said support legs extending upwardly and inwardly from a respective one of said vertical legs towards another of said lips at an angle of about 20° with respect to a horizontal plane, thereby presenting a generally linear contact surface for said neck ring and also enhancing lifting forces imposed on said neck ring by the conveying fluid flowing through said slots in said outer side wall of said plenum.

15. A process comprising:

(A) supporting a neck ring of a bottle on opposed lips of a bottle neck guide, said bottle having a neck located beneath said neck ring, each of said opposed lips presenting a contact surface formed from an inclined support leg extending upwardly and inwardly towards another of said lips; and (B) propelling said bottle by directing a conveying fluid onto said bottle at a location beneath said neck ring, wherein said inclined support legs direct conveying fluid onto an interface between said neck ring and said support legs, thereby increasing lift and reducing drag as said bottle slides along said neck guide, wherein said propelling step comprises directing said conveying fluid onto a single side of said bottle only.

* * * * *